United States Patent [19]
Lace

[11] 3,774,861
[45] Nov. 27, 1973

[54] SPRING CLUTCH MECHANISM F TAPE CARTRIDGE

[75] Inventor: Melvin A. Lace, Prospect Heights, Ill.

[73] Assignee: Motorola, Inc., Franklin Park, Ill.

[22] Filed: June 21, 1971

[21] Appl. No.: 155,015

[52] U.S. Cl. .......... 242/55.19 A
[51] Int. Cl. .......... B65h 17/48
[58] Field of Search .......... 242/55.19 A, 197, 242/198, 199, 200; 352/78, 72; 179/100.2 Z

[56] References Cited

UNITED STATES PATENTS

| | | | |
|---|---|---|---|
| 3,059,871 | 10/1962 | Loewe | 242/198 |
| 3,350,025 | 10/1967 | Lear | 242/55.19 A |
| 2,962,238 | 11/1960 | Loewe | 242/198 |

*Primary Examiner*—Billy S. Taylor
*Attorney*—Vincent Rauner et al.

[57] ABSTRACT

A tape cartridge for use in tape players having an internal tape spool assembly within a housing enclosure including an endless tape wound on a freely rotatable generally circular tape spool. The tape cartridge contains an elongated blade-like spring member mounted therein and having a free end portion engaging the spool assembly so as to comprise a one-way spring clutch mechanism whereby rotation of the tape spool in a first direction is permitted because of movement of the engaging free end portion away from engagement with the spool assembly, but rotation in the opposite direction is prevented because of the continuously tightening movement of the free end portion of the spring member against the spool assembly.

4 Claims, 6 Drawing Figures

PATENTED NOV 27 1973

3,774,861

INVENTOR:
MELVIN A. LACE
BY: Lester N. Arnold
ATTY.

SPRING CLUTCH MECHANISM F TAPE CARTRIDGE

BACKGROUND

This invention relates to insertable tape cartridges, and more particularly, to a tape cartridge provided with a spring clutch mechanism in engagement with a freely rotatable tape spool assembly for permitting rotational movement in a first direction and preventing movement in an opposite rotational direction.

Tape cartridges of the power driven variety having an endless or closed loop tape wound on a substantially free rotating tape spool quite often employ one-way clutch mechanisms in connection with the rotational movement of the tape spool to prevent the undesirable reverse rotation of the spool from its normal operating direction of rotational movement. The reverse rotation of the tape spool, if allowed, quite often permanently disorients the tape upon the tape spool so that the cartridge must be discarded.

Present construction of the spool assembly within an individual tape cartridge is such that the take-off (feed) and take-up (reel) movements of the tape spool are not readily reversible. A tape oriented to feed from the inner convolution or loop of the tape spool is likely to become disoriented upon the spool with reverse spool rotation; also, the tape can become twisted or looped on the reel side of the spool when reverse rotation provides slack in the tape; thereafter, tape disorientation occurs upon continuing the normal rotational movement of the spool. Most existing clutch mechanisms are installed about the rotational center axis or hub of the tape spool and restrict reverse movement at the axis of rotation. While these hub-mounted clutch mechanisms are generally satisfactory in their operation, they suffer from the disadvantages of being more costly to manufacture and install than is necessary to accomplish the purposes thereof. Also, these clutch mechanisms are not readily installable except during original manufacture of the tape cartridges. It is desirous to have a one-way clutch mechanism that is simple in its operation, economical to manufacture and which can be installed on existing cartridges which do not include protection against reverse rotational movement.

SUMMARY

It is therefore an object of this invention to provide a simple and economical one-way clutch mechanism which is oriented away from the center axis of the tape spool.

It is another object of the invention to provide a one-way clutch mechanism that can be installed within existing tape cartridges which do not include protection against reverse rotational movement.

A one-way spring clutch for use within a tape cartridge housing containing a spool assembly having an endless tape wound on a substantially free rotating generally circular tape spool, comprises an elongated blade-like spring member fixedly mounted within the housing generally adjacent the spool assembly and having a free end portion thereof extending toward and frictionally engaging the spool assembly in a manner so as to move away from engagement therewith when the spool is rotated in a first rotational direction and so as to continuously tighten against the spool assembly when the spool is rotated in a second rotational direction opposite from the first rotational direction whereby the spring member permits movement in the first rotational direction and prevents movement in the second rotational direction.

THE DRAWING

DETAILED DESCRIPTION

Figures 1, 2, 3, 4, 5:
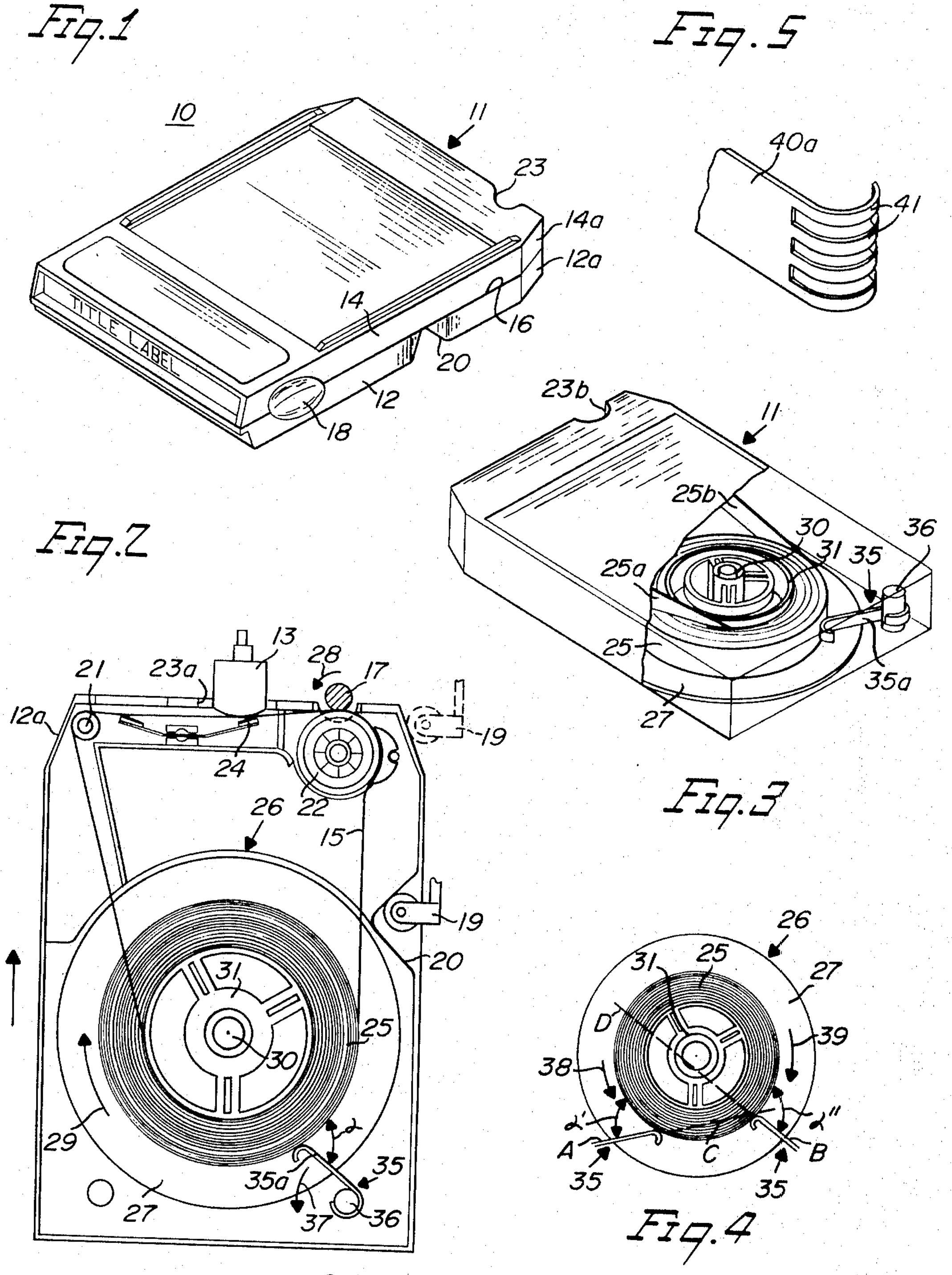
FIG. 1 is a frontal perspective view of a tape cartridge of the type within which to accommodate the present invention.
FIG. 2 is a top plan view of the tape cartridge of FIG. 1 with the top cover of the housing enclosure and the top layer of the tape spool removed to more clearly show a one-way spring clutch in engagement with a spool assembly.
FIG. 3 is a partial perspective view of the spool assembly similar to FIG. 2 showing the construction of one embodiemnt of the spring clutch.
FIG. 4 is an isolated top plan view of the spool assembly showing alternative manners in which the one-way spring clutch may be oriented with respect thereto.
FIG. 5 is a fragmentary perspective view of the one-way spring clutch showing an alternative embodiment for its free end portion.

FIG. 1 shows an insertable tape cartridge 10 having an outer casing 11 comprising a protective housing enclosure for an endless or closed loop magnetic tape having multiple tracks of recorded data thereon. The cartridge 10 is of the common variety of tape cartridges that are designed to be slidably inserted into a playing position within access cavities of tape players which are not shown in the drawing. The manner of operation of these tape players as well as the manner in which a selected tape cartridge is received within and operated with respect thereto do not require other than a brief explanation in connection with the present invention.

The outer casing 11 for the cartridge 10 is typically constructed of molded plastic parts having relatively high durability and of rugged assembly, and is comprised of a bottom plate 12 and a complementary top cover plate 14 separable along an interface section indicated at 16 in FIG. 1. The insertable end portion of the cartridge 10 includes beveled wall portions **12*a* and 14*a*, for the plates 12 and 14, respectively, which wall portions facilitate the insertion of the cartridge 10 into the access cavity. The length dimension of the cartridge 10 is such that the opposite end portion remains extended protrudingly from the player so that the cartridge casing 11 can be grasped for withdrawing the cartridge 10. Depressed areas such as area 18** in FIG. 1 are conveniently provided on the protruding end portion whereby the fingers of an operator can better grasp the plastic housing for inserting and withdrawing the cartridge.

The manner in which the tape cartridge 10 is received within and operated with respect to an associated player is briefly illustrated in FIG. 2 wherein a magnetic tape pick-up head 13 is shown in engagement with an endless magnetic tape 15. The tape 15 is driven across the tape head 13 by a drive force supplied through the rotating capstan shaft 17, and the cartridge 10 is stabilized in its playing position in a large part by a spring biased roller latch 19 being received within a recessed groove 20 within the bottom plate 12 of the casing 11.

As the cartridge 10 is being inserted into its playing position within the access cavity of the selected player, one of the beveled wall portions, such as wall portion 12*a*, engages the roller latch 19 and forces it outwardly against its direction of bias. The latch is caused to ride along the side of the casing 11 until the depth of insertion of the casing is such that the latch 19 is aligned with and received within the recessed groove 20. The tape 15 is stored in wrapped fashion, at 25, on a substantially free rotating generally circular tape spool or reel 27, only one plate of which is shown in FIGS. 2 and 3, the other plate being removed for more clearly illustrating the wrapped tape 25. The tape 15 is drawn from and returned to the spool 27 in a continuous manner during the playing mode. The wrapped tape 25 and the tape spool 27 comprise a spool assembly 26.

The tape cartridge 10 contains within the insertable end portion thereof a guide roller 21 and a pressure roller 22 aligned to present the tape 15 to the tape head 13 in a substantially tangential arrangement. With the cartridge 10 in its playing position, the pressure roller 22 is effective to pinch the tape 15 between its outer peripheral surface and the capstan shaft 17 whereby the capstan shaft supplies the drive to move the magnetic tape past the tape head 13. The casing 11 of the tape cartridge 10 contains suitable access openings such as openings 23*a* and 23*b* in its insertable end portion for receiving the tape head 13 and capstan shaft 17. Spring biased pads 24 hold the tape 15 in firm engagement with the tape head 13.

As the tape strip 15 is pulled past the tape head 13 and consequently from the tape spool 27, the tape 15 is withdrawn from the inner convolution or loop 25*a* of the wrapped tape 25 and taken up on the outer convolution 25*b* thereof in a well known manner. The rotational directions indicated at 28 and 29 in FIG. 2 for the capstan shaft 17 and tape spool 27, respectively, establish these take-off (feed) and take-up (reel) movements for the tape 15 and tape spool 27. While in the tape playing position within the associated tape player, the pressure of the pinched engagement of the tape 15 between the capstan shaft 17 and the pressure roller prevents the possibility of a reverse movement of the tape 15 in both the static and dynamic operational modes of the player. However, protection against reverse movement of the tape 15 must be supplied internal to the tape cartridge casing 11 in order to provide such protection for individual tape cartridges when they are disassociated with the tape player.

Some tape cartridges presently have one-way clutch mechanisms installed therein, and a common configuration for such mechanisms is a spring coil provided as an interface between a central mounting post 30 for the spool assembly 26 and a hub portion 31 of the tape spool assembly 26. Reverse rotation of the spool assembly causes the individual coils of the spring coil to tighten thereby restricting rotational movement of the spool assembly. Now, in accordance with the present invention, a one-way spring clutch mechanism is provided which is mounted generally adjacent an outer peripheral edge of the spool assembly 26 and is in the form of a relatively elongated blade-like spring member 35.

FIGS. 2 and 3 show the flexible spring member 35 as having one end portion wrapped around and attached to one of the several support posts 36 of the casing 11. The other or opposite end of the spring member 35 comprises a free end portion 35*a* which extends toward and engages a selected outer peripheral edge of the spool assembly 26. The free end portion 35*a* as shown in FIGS. 2 and 3 engages the outer peripheral surface of the wrapped tape 25, thus affecting directly the movement of the tape 15 and indirectly the rotational movement of the tape spool 27. Obviously, the tape spool itself could also be engaged in lieu of the tape 15. One advantage in choosing to engage the wrapped tape 25 is that since it is of constant diameter, the spring member 35 comprises a guide means to better control uniformity of diameter.

The spring member 35 is in the form of a generally flat leaf spring so as to be blade-like in its construction with the flat side presented for engaging the tape over a surface area as contrasted to a point or line of contact between the spring member 35 and the wrapped tape 25. The spring member 35 is designed to flex in the direction of the rotational movement of the spool assembly 26. With the spool assembly rotating in a first rotational direction suitable for playing the tape 15 as indicated by the arrow 29 in FIG. 2, the free end portion 35*a* of the spring member 35 will move in the direction of the arrow 37. This movement of the spring member away from contact with the wrapped tape 25 permits the spool assembly 26 to turn unimpeded by the one-way spring clutch mechanism. The frictional engagement between the spring member 35 and the wrapped tape 25 is reduced to a minimum value so as not to wear away the oxide coating of the tape 15 through abrasive forces.

Now, with rotation of the spool assembly in a second rotational direction opposite from the first rotational direction, the frictional engagement of the tape with the free end portion 35*a* causes the spring member 35 to flex in the opposite direction from direction 37 with the attempt of the spring member to follow the tape 15. The spring member 35 flexs but is generally incompressible along its length dimension and therefore tightens continuously against the wrapped tape 25 so as to prevent the rotational movement thereof. It should be noted that substantially the entire length of the spring member 35 in FIGS. 2 and 3 is straight and defines an acute angle $\alpha$ with the approaching surface of the tape as shown in FIG. 2. This acute angle is such that the flexing movement of the spring member 35 in the direction of the arrow 37 will decrease the amount of frictional engagement between the spring member and the tape. Also, the opposite flexing movement of the spring member 35 causes the free end portion 35*a* to move inward of the diameter of the wrapped tape in a biting fashion.

Figure 6:
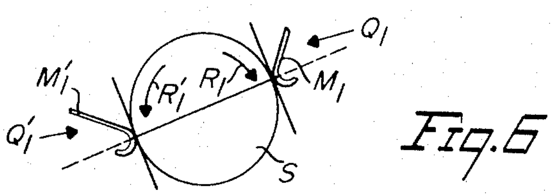
FIG. 6 is a graphical representation of two alternative orientations for the clutch similar to the illustration of FIG. 4.

FIGS. 4 and 6 illustrate the manner in which the free end portion 35a of the spring member 35 can extend toward and engage the surface of the wrapped tape 25. FIG. 4 shows free end portions A and B of two alternative spring members extending toward the wrapped tape along lines comprising lines of intersection C and D with the circular area of the wrapped tape 25, respectively. These free end portions are at angles $\alpha'$ and $\alpha''$ with the approaching side of the tape as shown by arrows 38 and 39 which indicate alternative first directions of rotational movement. These lines of intersections C and D comprise minor chords of the circular area of the wrapped tape 25. The orientation of the spring member is such that the first direction of rotational movement is in a direction so as to enter these chord areas on the side adjacent to the engaging free end portion of the associated spring member.

FIG. 6 shows alternative free end portions $M_1$ and $M_1'$ engaging the circumference of a circular area S which graphically represents either the wrapped tape 25 or the tape spool 27. The engagement of the free end portion $M_1$ is at the junction of a diameter of the area S and a tangent normal to the diameter. With the diameter extended as shown in FIG. 6, two external quadrants are defined which lie between the extended diameter and the tangent, the spring portion $M_1$ being located anywhere within a first quadrant area $Q_1$ of the two external quadrants. With $M_1$ located within quadrant $Q_1$, the unrestricted direction of rotation of the tape spool 26 would be as indicated by the arrow $R_1$ in FIG. 6 wherein the direction of rotation at the junction lies along the tangent in a direction away from the first quadrant area $Q_1$. Also, the spring member, such as member $M_1'$, could be located on the opposite side the area S anywhere within another quadrant $Q_1'$ formed by the extended diameter and a tangent normal to the diameter where the unrestricted direction of rotation would then be in the direction of the arrow $R_1'$.

It should be noted that the spring member in a particular quadrant becomes increasingly less effective as the angle approaches zero degrees (0°) so that the spring member becomes aligned with the tangent and as the angle $\alpha$ approaches 90° so that the spring member becomes aligned with the extended diameter. When the spring member lies along either the tangent or the extended diameter, the spool assembly 26 may be freely rotated in both directions. Of course, the degree of flexibility of the spring member 35 will affect whether the operation of the spring member is successful at angles very near these outside limits.

That part of the free end portion 35a that is in engagement with the wrapped tape 25 is provided with an arcuate shape so that a convenient area of contact is obtained between the spring member and the wrapped tape. For the spring member shown in the drawing, the greater portion of the curvature of the arcuate engaging part is positioned out of engagement with the wrapped tape 25 so as to move away from the tape with rotation of the spool assembly 26 in the first rotational direction, and so as to move into continuously tightening engagement with the wrapped tape 25 with rotation of the assembly 26 in the second or opposite rotational direction.

In essence, the free end portion of the spring member can extend toward and engage the spool assembly at any junction of a diameter of the spool assembly and a tangent normal to that diameter. The free end portion immediately adjacent the engaging end thereof shall lie within an external quadrant formed between the extended diameter and the tangent with the direction of unrestricted rotation at the junction lying along the tangent in a direction away from the quadrant in which the free end portion lies. So long as these criteria are met, it is unimportant where in the casing 11 that the spring member 35 is mounted and in what particular configuration it appears other than the free end portion 35*a* desirably shall be in accordance with the above description.

An alternative embodiment for the free end portion 35*a* of the spring member 35 is shown at 40*a* in FIG. 5 wherein the arcuate engaging part thereof is comprised of a plurality of curved and separate tine-like portions 41. The tines 41 are spaced apart with sufficient spacing to permit them to function independently of each other in their movement away from or toward the wrapped tape 25. This configuration will obviously decrease the area of contact with the wrapped tape and correspondingly decrease the frictional wear on the tape; also, the decreased area of contact is generally off-set by the increased sensitivity of the flexing movement of the tines 41.

While the present invention has been shown and described with reference to the preferred embodiments thereof, the invention is not limited to the precise form set forth herein, and various modifications and changes may be made without departing from the spirit and scope thereof.

I claim:

1. A one-way brake assembly for a tape cartridge designed for insertion into a cartridge type tape player for playback and for withdrawal therefrom for storage, the cartridge including a spool assembly mounted therein having an endless wound tape contained on a substantially free rotating tape spool rotatable in a first direction for playing the tape and rotatable in a second direction opposite from the first direction, said brake assembly comprising a post member mounted fixedly in said cartridge adjacent an outer peripheral edge of said spool assembly, spaced therefrom and an elongated, flexible, blade-like spring member fixedly mounted at one end thereof on said post member, the opposite free end of said spring member being curved and extending toward and continuously engaging the spool assembly tangentially with respect thereto at the junction of an extended diameter of said spool assembly and a tangent normal to said diameter, said extended diameter and said tangent defining a first quadrant area external to said spool assembly with the length of said curved end of said blade-like spring member lying therein and with the direction of first rotational movement of the spool assembly at said junction being away from said first quadrant area so that with movement of said spool assembly in said second rotational direction said curved end of said spring member applies a braking force to said spool assembly which increases with continued movement of the latter in said second direction to prevent further movement of said spool assembly in said second direction, and with movement of said spool assembly in said first rotational direction, said spring member flexes to remove substantially the braking force provided at said curved end of said spring member to permit substantially free movement of said spool assembly in said first rotational direction.

2. A one-way brake assembly as claimed in claim 1 wherein said curved end of said spring member includes a plurality of separate tine-like portions for engagement with the spool assembly.

3. A one-way brake assembly as claimed in claim 1 wherein the curved end of said spring member frictionally engages said tape spool.

4. A one-way brake assembly as claimed in claim 1 where the curved end of said spring member frictionally engages said endless wound tape.

* * * * *